Sept. 27, 1932.   N. O. LINDSTROM   1,879,357
BEARING
Filed July 30, 1930
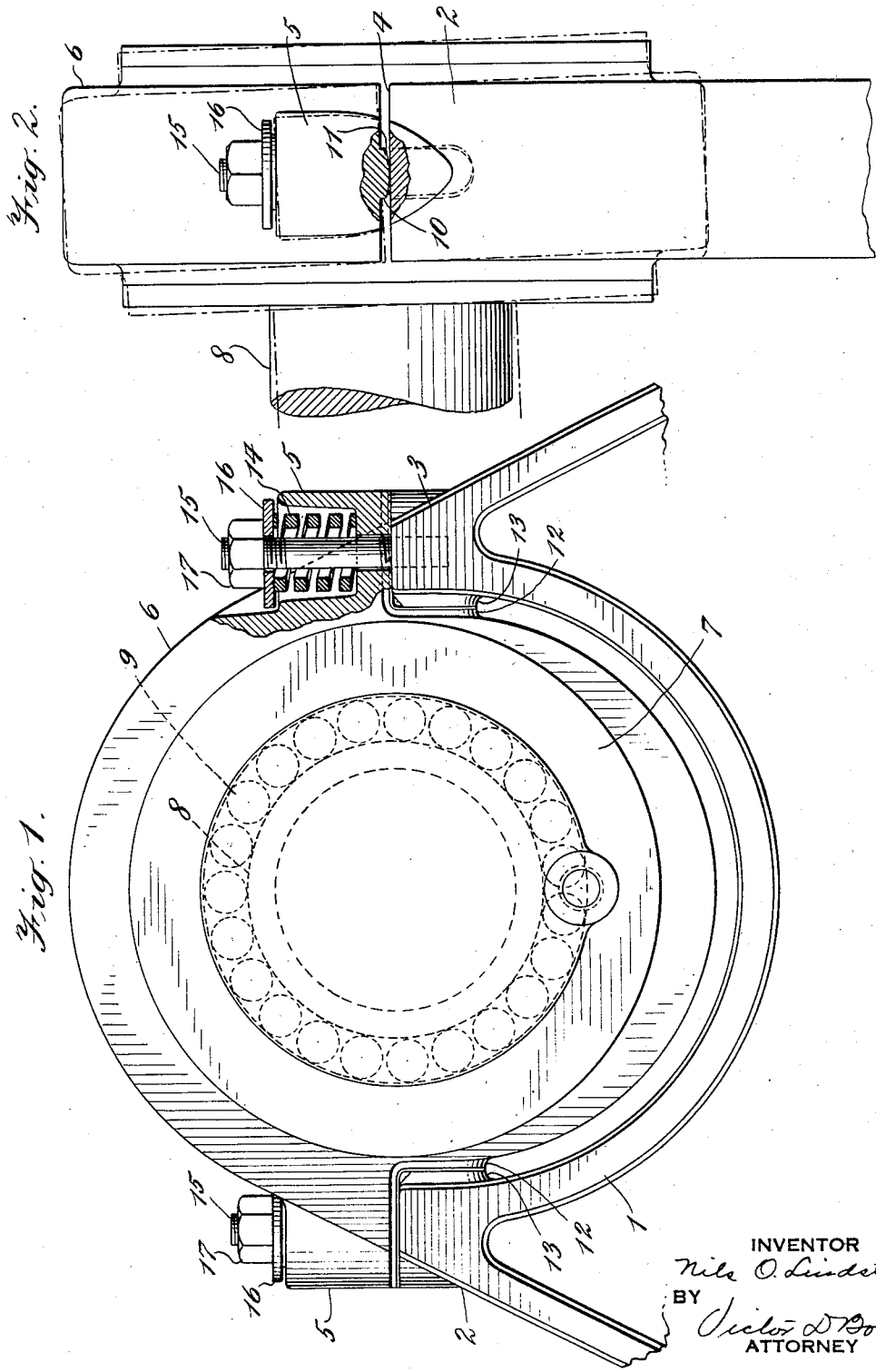

Patented Sept. 27, 1932

1,879,357

UNITED STATES PATENT OFFICE

NILS O. LINDSTROM, OF NUTLEY, NEW JERSEY, ASSIGNOR TO A. B. SEE ELEVATOR COMPANY, INC., A CORPORATION OF DELAWARE

BEARING

Application filed July 30, 1930. Serial No. 471,663.

My invention relates to bearings. In particular, the invention contemplates a bearing capable of following the movements of a shaft journaled therein, which movements, at the bearings, are caused by the bending of the shaft intermediate the bearings.

In general, bearings adapted to journal a shaft are rigidly mounted on the frame of the machine with which they are associated. Frequently, the forces acting upon a shaft vary in intensity and kind and the shaft is caused to bend or flex between the bearings. Even though the bending action is infinitesimal, it is sufficient to disturb the alignment of the shaft with respect to the bearing. Where this occurs, the edges of the bearings act as fulcrums and support the entire weight of the shaft. Under such conditions the life of the bearings is materially shortened, due to the wearing of the edges, and frequent replacement is required. Such conditions decrease the effectiveness of machines and materially increase the operating cost.

In accordance with my invention, I provide a bearing adapted to follow the movements of the shaft journaled therein so that the bearing is at all times coaxial with the shaft. I accomplish this object by providing a bearing support, and mounting the bearing on the support so that the bearing is free for limited movement with respect to the support.

Specifically, I provide a bifurcated bearing support. The bearing is mounted between the stems of the bifurcated bearing support. The casing of the bearing is provided with extensions which rest upon the upper edge of the stems of the support. The surfaces of the extensions which abut against the upper edge of the stems of the support, are convexed so that they contact with the surfaces of the stems only along a line. These convexed surfaces are extended along the sides of the bearing casing for a short distance and abut against flat surfaces on the sides of the stems. The bearing casing is resiliently secured to the bearing support so that it is free for limited movement with respect to the support. The line contact between the bearing and supports permits instantaneous movement of the bearing with respect to the support.

A more clear understanding of my invention will be had from the following particular description of one embodiment thereof, taken in connection with the accompanying drawing in which:

Fig. 1 is an end elevation of a bearing constructed in accordance with my invention; and Fig. 2 is a side view of the same.

As shown in the drawing, a bifurcated bearing support 1 is provided, the support shown being semi-cylindrical in cross sections. The upper edges of the stems 2 and 3 of the bifurcated support are formed with substantial flat surfaces 4 upon which extensions 5 formed on the bearing rest.

The bearing shown is of the roller bearing type and comprises a casing 6 on which the extensions 5 are formed. Within the casing 6 there is a cylindrical sleeve 7. Between the sleeve 7 and the shaft 8 there are inserted rollers 9 as shown. The extensions 5 which rest upon the stems of the bifurcated support are provided with narrow projections 10, the lower surfaces 11 of which are convexed and abut against flat surfaces 4 of the upper edges of the stems of the bifurcated support. These projections 10 and convexed surfaces 11 are extended for a short distance along the sides of the bearing casing between the stems of the bifurcated support. The extended portions 12 abut against extensions 13 formed on the sides of the stems of the bifurcated support. The casing 6 of the bearing is resiliently secured to the support so that it is free for limited movement with respect to the support as shown by the broken lines in Figure 2. The line contact between the bearing casing and the support provided by the convexed surfaces 11 minimizes the friction between the surfaces and facilitates the movement of the bearing with respect to the support.

The extensions 5 on the bearing casing are hollow and form housings for springs 14. Bolts 15 extend through the extensions 5 and are embedded in the stems of the support. The bolts 15 extend up through the springs 14 in the extensions 5. Washers 16 abut against the upper end of the springs 14 and the springs are compressed by nuts 17 which are threaded on the bolts 15.

From the foregoing description of the embodiment of my invention shown in the drawing, it will be apparent that the bearing of my invention is capable of following the movements of that portion of the shaft which is journaled therein. This is especially advantageous in elevator machinery wherein the shafts are subject to loads that vary in direction and kind and the shafts are frequently bent between the bearings.

It is obvious that various changes may be made in the details of the embodiment shown in the drawing and above particularly described by those skilled in the art within the principle of my invention, as defined in the appended claims.

I claim:

1. A bearing adapted to follow movements of a shaft journaled therein so that the bearing is at all times coaxial with the shaft, which movement of the shaft at the bearing results from the shaft bending between the bearings, comprising a bifurcated support, a bearing mounted in the support, extensions on the bearing having convexed surfaces resting upon the ends of the stems of the support, and means for resiliently securing the bearing to the support.

2. A bearing adapted to follow movements of a shaft journaled therein so that the bearing is at all times coaxial with the shaft, which movements of the shaft at the bearings results from the shaft bending between the bearings, comprising a bifurcated support, a bearing mounted in the support, extensions on the bearing having convexed surfaces resting upon the ends of the stems of the support and the sides of the bearing having convexed surfaces abutting against the sides of the stems of the supports, and means for resiliently securing the bearing to the support.

3. A bearing adapted to follow movements of a shaft journaled therein so that the bearing is at all times coaxial with the shaft, which movements of the shaft at the bearings results from the shaft bending between the bearings, comprising a bifurcated support, a bearing mounted between the stems of the bifurcated support, an extension on each side of the bearing and extending over a stem of the support, a projection on the lower surface of each extension and the sides of the bearing having a convex surface, the convex surfaces on the extensions resting upon the edges of the stems of the support and the convex surfaces on the sides of the bearing abutting against the sides of the stems of the support, and means for resiliently securing the extensions to the support.

4. A bearing adapted to follow movements of a shaft journaled therein so that the shaft is at all times coaxial with the shaft comprising a bifurcated support, a bearing mounted between the stems of the bifurcated support, hollow extensions formed on the sides of the bearing and extending over the edges of the stems of the support and the internal diameter of the extensions being reduced to form a shoulder within the extension, a projection portion on the lower surface of each extension and on the sides of the bearing having a convex surface, the convex surfaces on the extensions resting on the upper surfaces of the stems and the convex surfaces on the sides of the bearing abutting against the sides of the stems of the support, a bolt extending through each of the hollow extensions and secured in a stem of the support, an abutment on the bolt, and a spring surrounding the bolt and acting between the abutment thereon and the shoulder formed in the hollow extension.

In witness whereof, I hereunto subscribe my signature.

NILS O. LINDSTROM.